United States Patent
Overdick et al.

(10) Patent No.: US 6,600,159 B2
(45) Date of Patent: Jul. 29, 2003

(54) IMAGE CORRECTION METHOD FOR AN X-RAY DETECTOR

(75) Inventors: Michael Overdick, Langerwehe (DE); Walter Ruetten, Linnich/Ederen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 216 days.

(21) Appl. No.: 09/925,398

(22) Filed: Aug. 9, 2001

(65) Prior Publication Data

US 2002/0024017 A1 Feb. 28, 2002

(30) Foreign Application Priority Data

Aug. 10, 2000 (DE) .......................... 100 39 002

(51) Int. Cl.$^7$ ................................. G01T 1/20
(52) U.S. Cl. .............. 250/370.11; 250/361 R; 250/363.09
(58) Field of Search ............ 250/370.11, 581, 250/584, 586, 361 R, 362, 363.09

(56) References Cited

U.S. PATENT DOCUMENTS 5,905,772 A * 5/1999 Rutten et al. .............. 378/98.8

FOREIGN PATENT DOCUMENTS

| EP | 0003454 | 8/1979 | ............ H01J/35/04 |
| EP | 0440282 | 8/1991 | ............ H04N/3/15 |

* cited by examiner

*Primary Examiner*—Constantine Hannaher
*Assistant Examiner*—Timothy J. Moran
(74) *Attorney, Agent, or Firm*—John Vodopia

(57) ABSTRACT

The invention relates to an image correction method for an X-ray detector which includes a rear-mounted light source with improved correction of the after-image effects.

Figure 1:
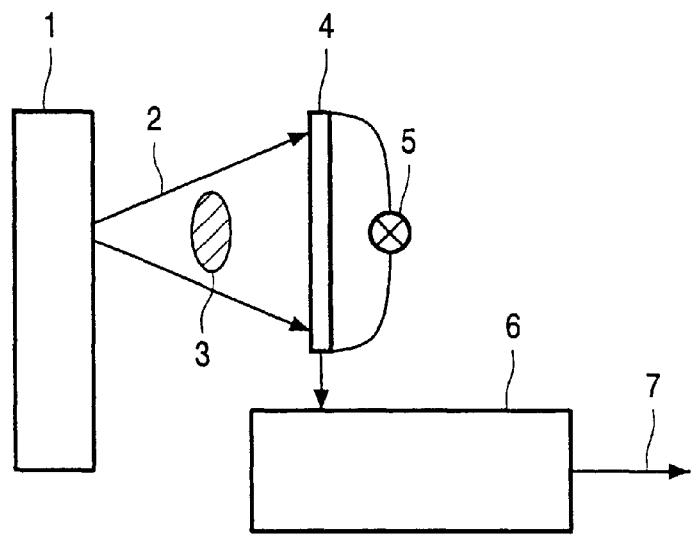

The invention is based on the recognition of the fact that the so-called gain effects cannot be eliminated by means of known methods. The gain effects, however, give rise to an increase of the amplification by a few percents, and hence to a bright image with artefacts, already in the case of customary diagnostic X-ray doses.

In accordance with the invention the gain effects are measured by acquisition of light source images by means of the build-in light source; the strength of the gain effect as well as a correction factor are determined pixel by pixel on the basis thereof. The pixel values of the bright image are corrected by means of the correction factor.

5 Claims, 1 Drawing Sheet

IMAGE CORRECTION METHOD FOR AN X-RAY DETECTOR

The invention relates to an image correction method for a flat dynamic X-ray detector which includes a sensor matrix whose photodiodes are preceded by a scintillator for converting the X-rays into light and succeeded by a light source for uniform illumination of all photodiodes. The invention also relates to an X-ray device.

Flat dynamic X-ray detectors (FDXD) are used notably in medical diagnostic X-ray devices. The construction of flat dynamic X-ray detectors is described, for example in EP 034 54 A2 as well as in EP 0 440 282 A2.

For the image correction method in accordance with the invention it is necessary that the X-ray detector includes a light source for uniform backlighting of all photodiodes of the X-ray detector. The installation and operation of the backlighting arrangement are known per se and are described, for example, in WO 98/01992.

For the flat dynamic X-ray detectors that are based on amorphous silicon it is known that image information from previous X-ray exposures may still be visible in later X-ray images. A remainder of the preceding image or the preceding images can then still be observed in the instantaneous X-ray image which will be referred to hereinafter as the bright image. Such undesirable image artefacts decay in time and are referred to hereinafter in general as after-image effects. Thus far the after-image effects are attributed to residual signals from the scintillator (afterglow) and from the photodiode. However, the incomplete reading out of the charge from the photodiode in the read-out amplifier is also known as a cause of residual signals. In a physical sense the so-called trapping and subsequent de-trapping of charge carriers in the scintillator and in the photocathode are the sources of the residual signal effects. For example, the charge carriers produced during an illumination of the photodiode are bound partly to trapping points (trapping). At a later instant the trapped charge carriers are released (de-trapping) again, thus leading to a delayed image signal and hence to a residual signal effect.

In order to eliminate such undesirable residual signal effects, DE 196 31 624 discloses an X-ray diagnostic device which includes a correction unit that detects any residual signals from at least one dark image. The residual signal component in the subsequent bright images can be determined and eliminated from said dark images in which only the instantaneous residual signal can be observed.

Experiments, however, have shown that after-image effects still occur in the bright images despite the dark image correction.

On the basis of this state of the art, therefore, it is an object of the invention to provide an image correction method for a flat dynamic X-ray detector of the kind set forth which enables improved correction of the after-image effects. It is also an object of the invention to propose an X-ray device which carries out said improved image correction method.

The solution to the described problem is based on the idea that in addition to the known residual signal effects there are further after-image effects which are not visible in pure dark images and hence cannot be eliminated by means of the known correction method. Such further after-image effects are so-called "gain effects" which occur in the scintillator as well as in the photodiode. Tests have demonstrated the existence of such gain effects for scintillators and photodiodes. It has been found that for customary diagnostic X-ray doses the gain effect in the scintillator is insignificant and hence need not be taken into account for the image correction method. The gain effect in the photodiode, however, may give rise to an increase of the gain by a few percents, and hence to visible after-image effects in subsequent bright images, already in the case of customary diagnostic X-ray doses.

Such gain effects can again be attributed to the trapping of charge carriers, because trapping points that are already occupied cannot accommodate further charge carriers. As a result, during the instantaneous bright image exposure the image signal increases in regions in which large numbers of trapping points are still occupied because of a preceding (X-ray) exposure, because fewer of the charge carriers produced can be bound to trapping points. The resultant increase of the image signal becomes manifest as a gain effect, but not directly as a residual signal effect.

The invention utilizes the fact that the gain effect in the photodiode can be made visible in an exposed image so that the strength of the gain effects in the photodiodes can be determined pixel by pixel. More specifically, the gain effect for each matrix cell of the sensor matrix is determined in conformity with claim 1.

The pixel values of the instantaneous bright image that have been corrected in accordance with the invention can then be further processed in known manner, for example by filtering, storage or introduction into networks.

Calculating the strength of the gain effects from at least one light source image and one light source reference image in accordance with the invention enables the formation of images with a significantly lower dose even after exposures with a high X-ray dose, such images formed with a lower dose nevertheless being free from the described gain effects to a high degree.

Because X-ray devices provided with a flat dynamic X-ray detector often also include a light source on the rear, the X-ray device does not require structural modifications so as to implement the image correction method in accordance with the invention.

In order to eliminate also the other after-image effects, simultaneously with the image correction method in accordance with the invention there is performed at least one further, known image correction method such as, for example, the previously described dark image method.

Figure 2:
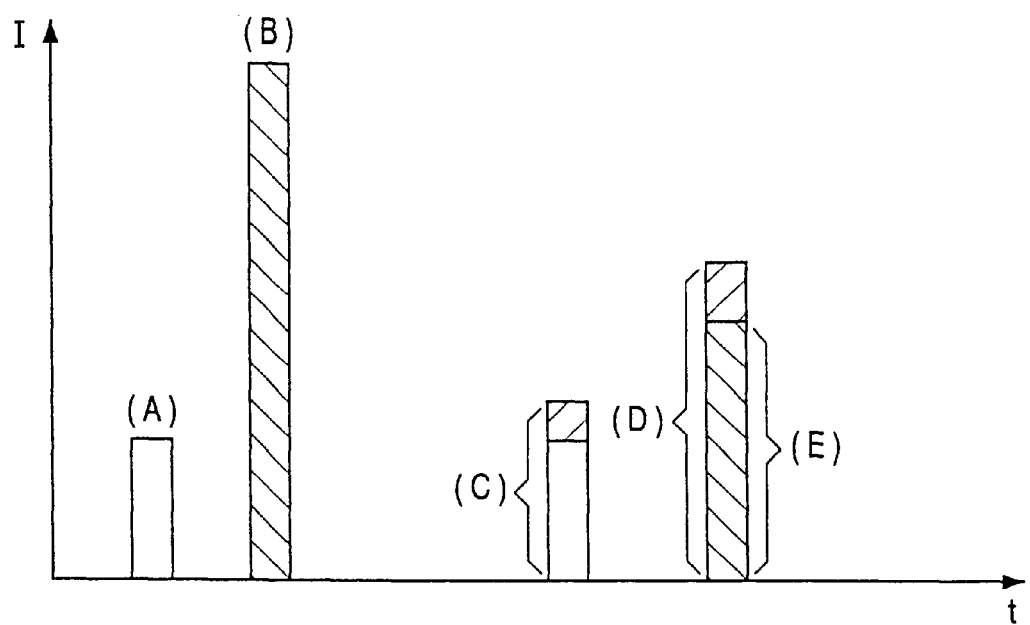

The invention will be described in detail hereinafter with reference to the drawings. Therein:

FIG. 1 shows diagrammatically an X-ray device for carrying out the image correction method in accordance with the invention, and FIG. 2 shows examples of the succession in time of various X-ray/light pulses, where I denotes the intensity of the X-ray/light pulse and t denotes the time.

The reference numeral 1 in FIG. 1 denotes an X-ray source whose X-rays 2 penetrate an object 3 to be examined, for example a human body. After having traversed the object 3 to be examined, the X-rays 2 are incident on a flat dynamic X-ray detector 4 in which the X-rays 2 are detected. In the beam path behind the X-ray detector 4 there is arranged a light source 5 for uniform illumination of all photodiodes within the X-ray detector 4.

The image signals of the X-ray detector 4 are applied to a correction unit 6 in which they are corrected, if necessary, by means of the correction method in accordance with the invention. The corrected image signals 7 can then be processed further in the usual manner.

For the correction of the image signals of the X-ray detector 4 first the X-ray source 1 is switched off. The after-image effects, notably the gain effects due to X-rays, decay within a few minutes. The sensor matrix of the X-ray detector 4 is then illuminated by means of the light source 5. The signals (pixel values) obtained in the individual pixels are stored as a light source reference image. When the X-ray source 1 is activated gain for a bright image exposure, after-image effects occur, notably gain effects. Before the after-image effects, notably the gain effects, decay due to the X-rays for the bright image exposure, the sensor matrix of the X-ray detector 4 is illuminated again by means of the light source 5 and the signals (pixel values) thus derived are stored pixel by pixel as a light source image. The acquisition of the light source reference images and the acquisition of the light source images both take place automatically.

Light source reference images are preferably acquired several times a day, for example if no bright image exposures have taken place over a prolonged period of time. The light source images should be acquired preferably directly before a bright image to be corrected. If light source images are acquired at short intervals (for example, every 10 seconds), it is ensured that when a bright image exposure takes place, the last light source image is not too old, i.e. that it has been acquired briefly before a bright image to be corrected.

In a version of the invention which is described in claim 3, however, this is not necessary if a further correction value (K') is calculated from at least one preceding correction value (K) by extrapolation so as to be applied to the subsequent bright images. The correction on the basis of the further correction value (K') is advantageous notably when the acquisition of bright images involving a high X-ray dose is succeeded by the acquisition of a plurality of bright images involving a lower X-ray dose, for example, in a fluoroscopy mode after bright image exposures with a high X-ray dose.

All pixel values of the light source reference image and of the subsequently acquired light source image are then available in the correction unit. A correction value is then calculated pixel by pixel as the quotient of the pixel values of the light source image and the pixel values of the light source reference image. Using this correction value, determined for each pixel, a corrected pixel value can be determined from each pixel value of a subsequent bright image, the series of corrected pixel values thus yielding the corrected image signal 7.

FIG. 2 shows the time diagram illustrating the irradiation of the X-ray detector 4.

After any after-image effects have decayed, a pixel value of the light source reference image which is denoted by the reference (A) is obtained for each pixel.

After exposure of the X-ray detector 4 to X-rays a pixel value of a first bright image which is denoted by the reference (B) is obtained for each pixel.

Before the after-image has effects decayed due to the X-rays, the renewed light source illumination produces a pixel value of the light source image which is denoted by the reference (C) for each pixel. As appears from the representation of the pixel value (C), it has been increased by gain effects in comparison with the light source reference image (A).

When a correction value is then calculated pixel by pixel from the quotient of the pixel value (C) and the pixel value (A), a corrected pixel value (E) can be calculated for each pixel value (D) of the subsequent bright image.

The following mathematical example illustrates the correction method in accordance with the invention:

pixel value (A) of the light source reference image=2000
pixel value (C) of the light source image=2100
pixel value (D) of the bright image=5250
correction value (K)
(K)=(C/(A))=2100/2000=1.05
pixel value (E) of the corrected bright image
(E)=(D/(K))=5250/1.05=5000.

It is to be noted that for reasons of clarity the residual signal effects that are known from the state of the art are taken into account neither in FIG. 2 nor in the above mathematical example.

What is claimed is:

1. An image correction method for a flat dynamic X-ray detector which includes a sensor matrix whose photodiodes are preceded by a scintillator for converting the X-rays into light and succeeded by a light source for uniform illumination of all photodiodes, characterized in that the gain effect is individually determined for each matrix cell of the sensor matrix in that the sensor matrix is illuminated at least once, after the decaying of any gain effects due to X-ray exposure (2), by means of the light source (5) instead of the X-ray source (1), the light source reference image thus acquired being stored, at a later instant, before the decaying of the gain effects due to X-ray exposure, the sensor matrix is illuminated again by means of the light source (5) instead of the X-ray source (2), the light source image thus acquired being stored, a correction value (K) is calculated pixel by pixel as the quotient of the pixel values (C) of the light source image and the pixel values (A) of the light source reference image, and subsequently a corrected pixel value (E) is determined, while taking into account the correction value (K), from every pixel value (D) measured pixel by pixel under the influence of X-rays.

2. An image correction method as claimed in claim 1, characterized in that the corrected pixel value (E) is determined by calculating the quotient of the pixel value (D), measured under the influence of the X-rays, and the relevant correction value (K).

3. An image correction method as claimed in claim 1, characterized in that a further correction value (K') is calculated from at least one previous correction value (K) by extrapolation and subsequently a corrected pixel value (E) is determined by calculating pixel by pixel the quotient of each pixel value (D), measured under the influence of the X-rays, and the further correction value (K').

4. An image correction method as claimed in claim 1, characterized in that together with the image correction method at least one further image correction method that is known per se is carried out for the correction of residual signal effects.

5. An X-ray device which includes a flat dynamic X-ray detector (4) with a sensor matrix whose photodiodes are preceded by a scintillator for converting the X-rays (2) into light and succeeded by a light source (5) for uniform illumination of all photodiodes, and also includes at least one correction unit (6) which acquires the image signals from the light source, produced by the sensor matrix, before and after the decaying of any gain effects due to X-rays (2), the correction unit (6) correcting the image signals of the instantaneous bright images in dependence on the presence of gain effects as well as on their intensity.

* * * * *